United States Patent [19]
Milner

[11] Patent Number: 6,082,420
[45] Date of Patent: *Jul. 4, 2000

[54] FLIP TOP HOUSING FOR TREE PROCESSING APPARATUS

[75] Inventor: Thomas M. Milner, Birmingham, Ala.

[73] Assignee: Timberjack Machinery, LLC, Bessemer, Ala.

[ * ] Notice: This patent is subject to a terminal disclaimer.

[21] Appl. No.: 09/289,892

[22] Filed: Apr. 12, 1999

[51] Int. Cl.[7] .............................. A01G 23/07; B27L 1/00
[52] U.S. Cl. ............................. 144/4.1; 30/382; 83/795; 83/788; 83/860
[58] Field of Search ................................ 144/4.1, 24.13, 144/338, 343, 251.1; 83/788, 794, 795, 859, 86; 30/381, 382, 383

[56] References Cited

U.S. PATENT DOCUMENTS

| | | | |
|---|---|---|---|
| 2,638,944 | 5/1953 | Woleslagle | 144/251.1 |
| 4,210,049 | 7/1980 | Gauthier | 83/788 |
| 4,467,686 | 8/1984 | Pyle | 83/860 |
| 5,533,555 | 7/1996 | Hudson | 144/24.13 |
| 5,699,712 | 12/1997 | Hudson | 83/795 |
| 5,887,635 | 3/1999 | Hamby, Jr. | 144/24.13 |

*Primary Examiner*—W. Donald Bray
*Attorney, Agent, or Firm*—Robert J. Veal; Kenneth M. Bush; Veal & Bush, LLC

[57] ABSTRACT

A flip top housing apparatus for side saw and topping saws used with a tree processing apparatus. The apparatus comprises a bottom section which attaches to one side of a plurality of hinges and a top section which pivotally attaches to the opposite sides of the hinges such that the top section is selectively moveable between a processing position atop the bottom section, shielding the saw blade from the surrounding environment during tree processing, and the transport position adjacent the bottom section, for allowing the housing to avoid low clearances during the transporting of the tree processing device. A lock comprising a handle portion, which fixedly attaches to the top section, and a receiving portion, which fixedly attaches to the bottom section, allows one to fasten the top and bottom section together during the processing position. The bottom section includes a plurality of guide flanges integrally connected to and vertically extending upwardly from bottom section such that the flanges may interlock with a plurality of recesses formed within the top section thereby stabilizing the housing apparatus in the processing position. A top and bottom tab extending substantially perpendicularly of the top and bottom section, respectively, are positioned such that apertures in each align as the top tab aligns with the bottom during the transport position thereby allowing a locking mechanism to be inserted therethrough.

12 Claims, 4 Drawing Sheets

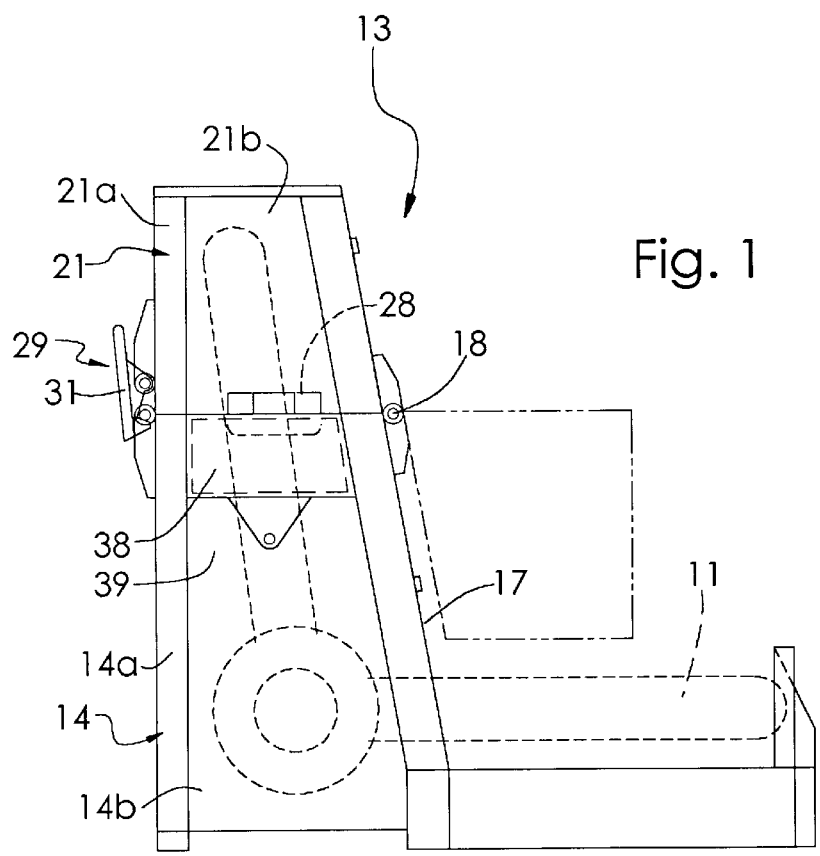
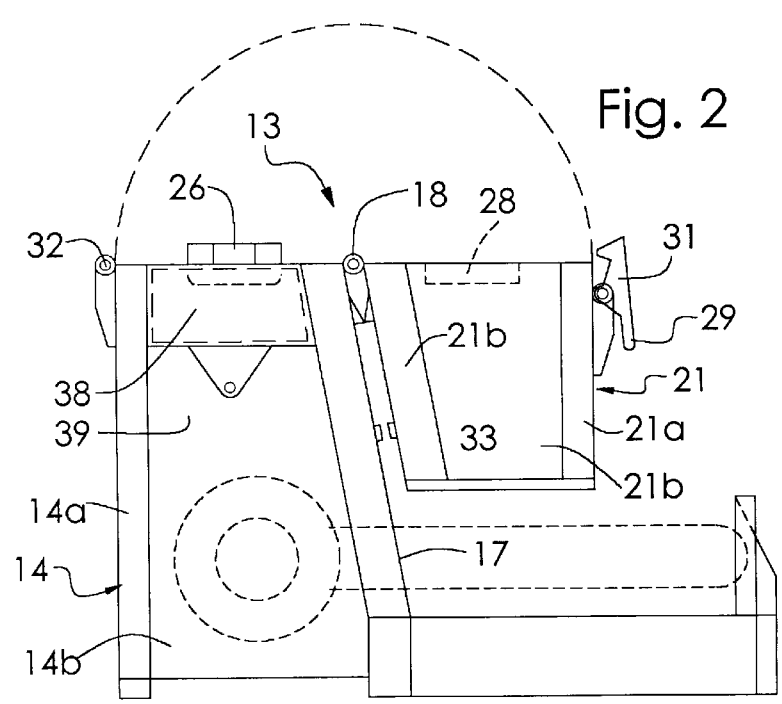

FLIP TOP HOUSING FOR TREE PROCESSING APPARATUS

FIELD OF INVENTION

The present invention generally relates to a tree processing apparatus, and more particularly to the housing for the topper and side saws present on such an apparatus. Still more particularly, the present invention relates to a flip top housing which has a top section pivotally mounted to a bottom section such that it is selectively moveable between a cutting position atop the bottom section and a transport position adjacent the bottom section.

BACKGROUND OF INVENTION

Tree processing devices for delimbing and topping trees are generally known in the prior art of the forestry and tree harvesting industry. It is known to mount a delimber, topping saw and side saw on a single trailer for transporting purposes to facilitate tree processing. The topping saw as well as the side saw require a saw blade of a length sufficient to cut trees with substantial diameters.

In the past tree processing devices have utilized housings as part of the frames used to cover the aforementioned saw blades. The principal reason for using housings in connection with frames is to protect operators and bystanders from the saw blades as they pivot to a raised position.

However, the height of the housings in the transport position causes problems when such housings encounter low bridges, power lines, and other obstacles during transporting of the tree processing apparatus. Nevertheless, the height of the aforementioned housings is necessary to facilitate the required lengths of saw blades required to cut trees with large diameters. As a result, the forestry and tree harvesting industries need a housing which will allow them to clear low objects during the transporting of a tree processing apparatus.

SUMMARY OF INVENTION

Therefore, it is the principal object of the present invention to provide a flip top housing for a tree processing apparatus which may be selectively pivoted between a processing position and a transport position.

Another object of the present invention is to provide a means of securing the top and bottom sections together during the transport position thereby maximizing safety for surrounding motorists during the transport position.

Yet, another object of the present invention is to provide a means of securing the top and bottom section together during the processing position.

These and other objects of the present invention are accomplished through the use of a housing comprising a bottom section which attaches to one side of a plurality of hinges and a top section which pivotally attaches to the opposite sides of the hinges. Thus, the top section is selectively moveable between a processing position atop the bottom section, providing a shield to the saw blade from the surrounding environment during tree processing, and a transport position. The transport position adjacent the bottom section allows the housing to avoid low clearances during the transporting of the tree processing device. A lock fastens the top and bottom section together during the processing position. The bottom section, also includes a plurality of flanges integrally connected to and vertically extending upwardly to interlock with a plurality of recesses within the lip of the top section, thereby stabilizing the housing apparatus in the processing position. A set of tabs extending substantially perpendicularly of the top and bottom section, respectively, are positioned such that apertures in each align as the top tab aligns with the bottom tab in the transport position thereby allowing a locking mechanism to be inserted therethrough. A reservoir for lubricating oil for the saw blade is mounted to one side of the lower section such that the reservoir does not interfere with the saw blade as the saw blade enters the housing.

Other features, objects and advantages of the present invention will become apparent from a reading of the following description in conjunction with the appended drawings.

BRIEF DESCRIPTION OF DRAWINGS

A flip top housing for a tree processing device incorporating the features of the present invention is depicted in the attached drawings which form a portion of this disclosure and wherein:

FIG. 1 is a side elevational view of the housing in the operating position;

FIG. 2 is a side elevational view of the housing in the travel position;

DESCRIPTION OF THE PREFERRED EMBODIMENTS

Figure 3:
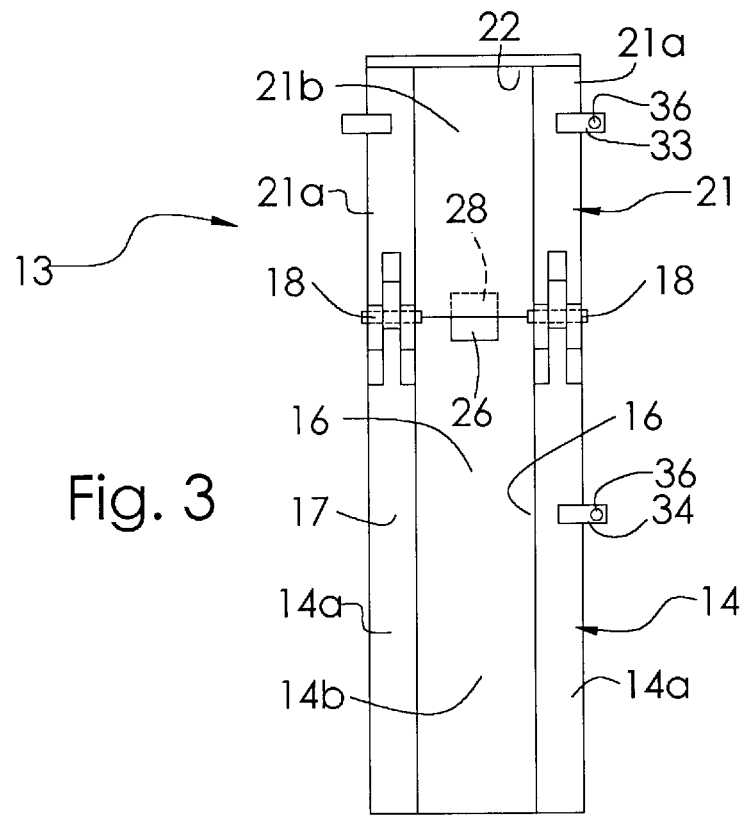
FIG. 3 is a front elevational view of the housing in the operating position.

Referring to the drawings for a better understanding of the function and structure of the invention, the preferred embodiments of the flip top housing for a tree processing device is illustrated in FIG. 1.

Figure 7:
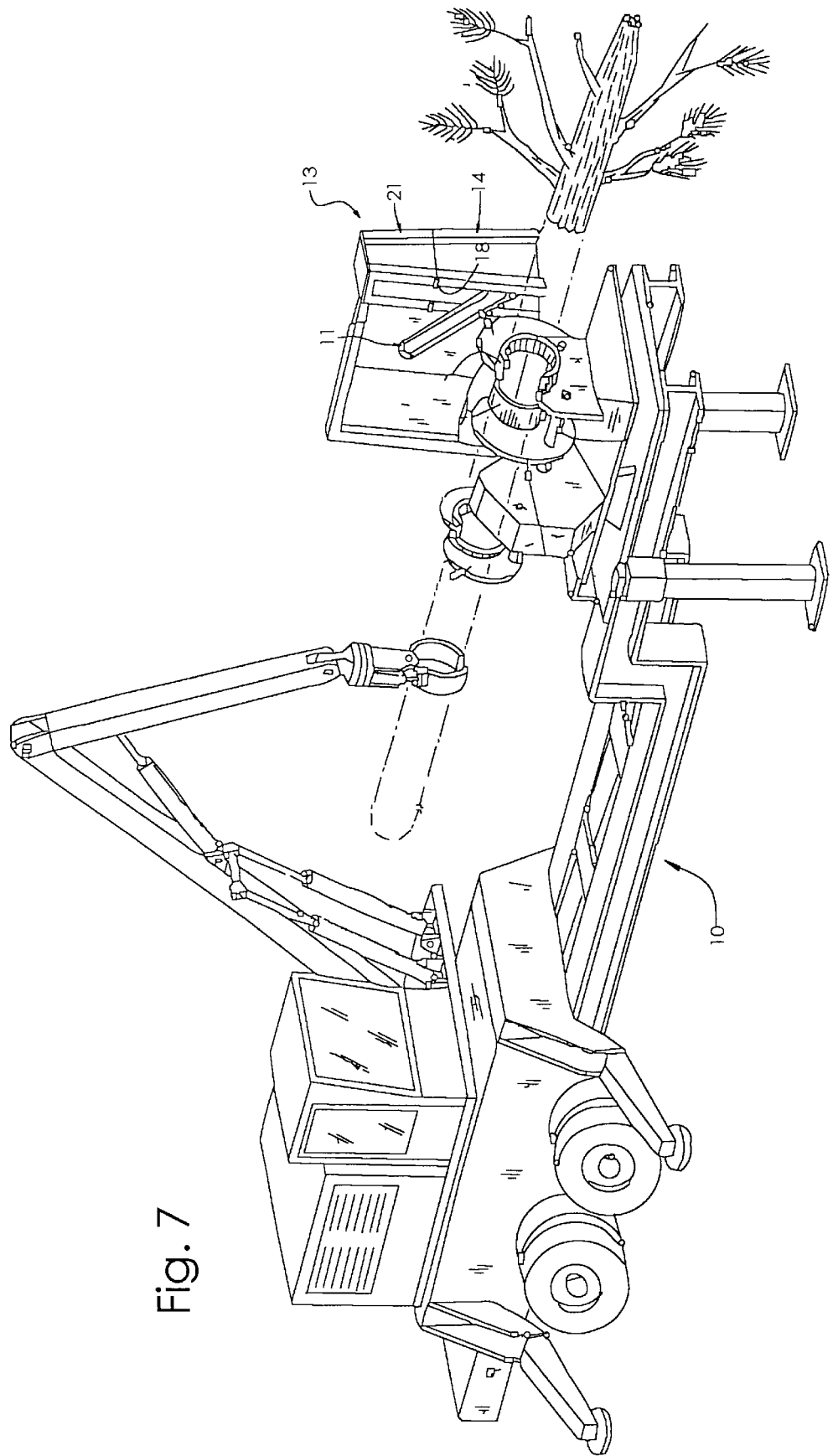
FIG. 7 is a perspective view of the delimbing trailer including a housing.

A tree processing trailer is indicated generally by number 10 as shown in FIG. 7. A topping saw 11 is mounted on the tree processing trailer 10. A side saw 12 is shown atop the trailer of the tree processing device 10. A flip top housing for covering either the topping saw 11 or side saw 12 is indicated generally by number 13 as shown in FIG. 1.

As shown in FIG. 1, the flip top housing 13 comprises a bottom section 14 having an opening 16 on the saw-receiving side 17 such that the saw may enter the housing 13. Bottom section 14 includes a plurality of steel reinforcing members 14a and a plurality of steel panels 14b welded together to form the generally vertical sides and rear enclosure of bottom section 14. A pair of hinges 18 attach to bottom section 14 on either side of opening 16 near the upper margin 19 of section 14. A top section 21, also fabricated with reinforcing members 21a and panel members 21b, having a cooperative opening 22 on the saw-receiving side 23 pivotally attaches to the opposite sides 24 of the hinges 18 for selective movement between a processing position atop the bottom section 14, for shielding the saw from the surrounding environment, and a transport position adjacent the bottom section 14.

Bottom section 14 includes a plurality of flanges 26 integrally connected to and vertically extending above the upper margin 19. As shown in FIG. 3, the top section 21 defines a set of internal recesses 28 along a lower margin 27 thereof for receiving the flanges 26 such that the flanges 26 interlock with the recesses 28 in the processing position thereby stabilizing the top section 21 and the bottom section 14.

Figure 4:
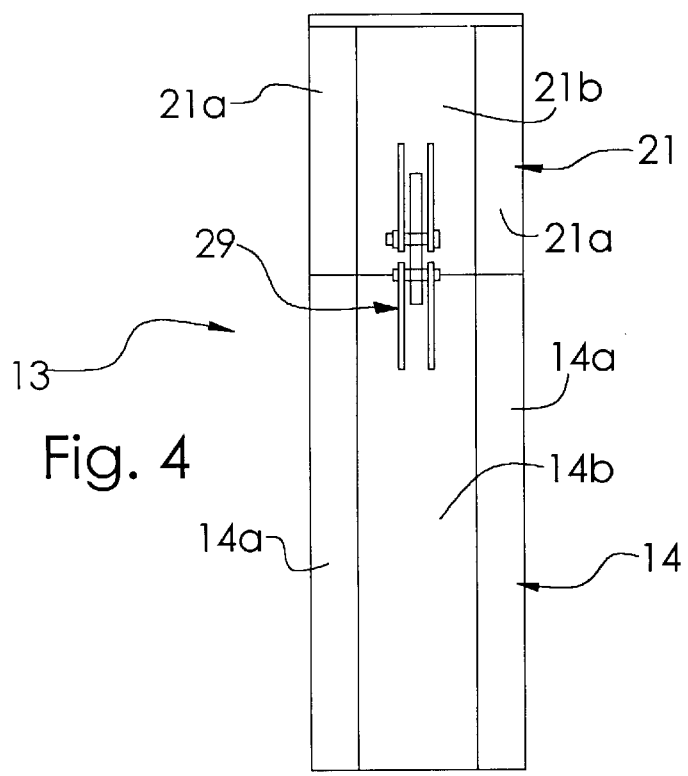
FIG. 4 is a rear elevational view of the housing in the operating position.
Figure 5:
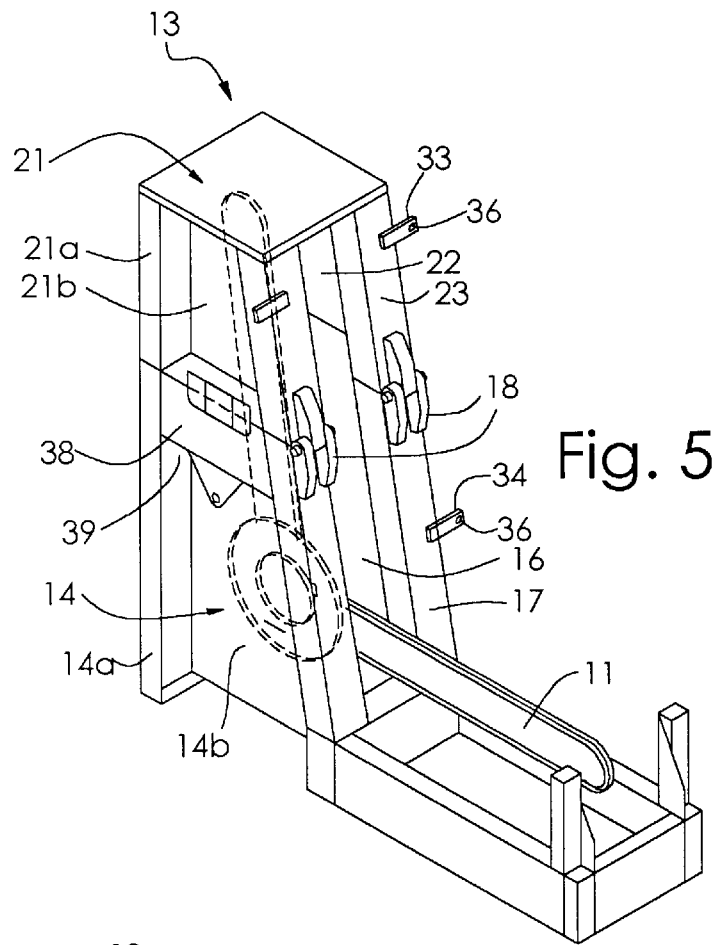
FIG. 5 is a perspective view of the housing in the operating position.
Figure 6:
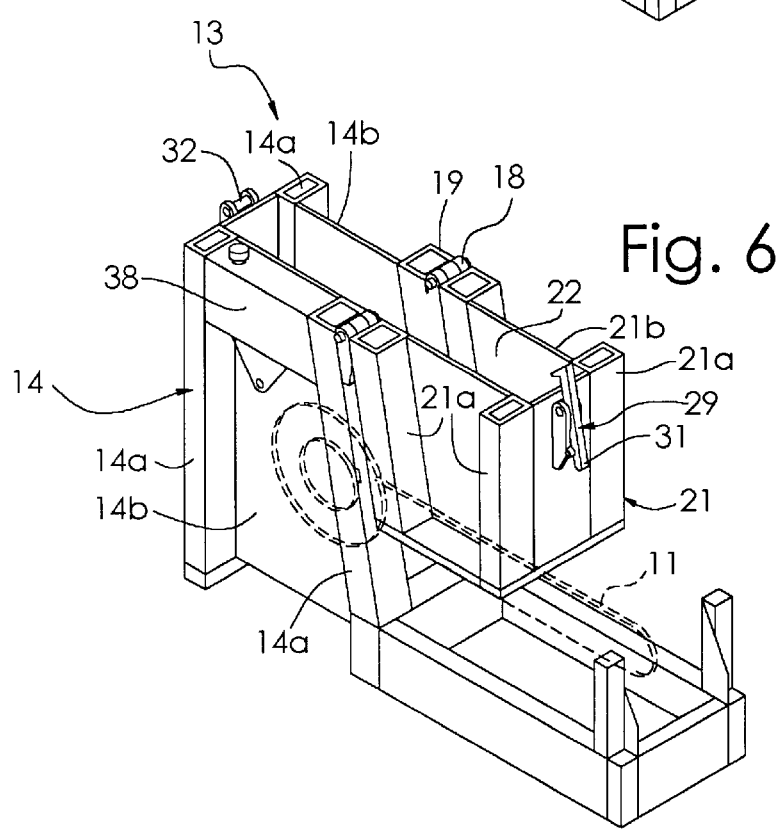
FIG. 6 is a perspective view of the housing in the travel position.

As shown in FIG. 4, a lock indicated generally by number 29 provides secured engagement of the top section 21 and the bottom section 14 in the processing position. As shown in FIG. 5, the lock 29 may be a conventional link and hasp combination. In one embodiment the lock comprising a handle portion 31 fixedly attached to top section 21 and including a locking link and camming handle and a receiving portion 32 fixedly attached to bottom section 14 such that the handle portion 31 interlocks with the receiving portion 32 to secure the sections in the processing position thereby providing secured engagement of the top section 21 and the bottom section 14.

As shown in FIG. 4, a pair of tabs 33, 34 each having an aperture 36 therethrough for receiving a lock 37, which may be a padlock, pin, clip, or wire, extend substantially perpendicularly of the housing 13. The tabs 33, 34 are defined as a top tab 33 extending substantially perpendicularly of the top section 21 and a bottom tab 34 extending substantially perpendicularly from the bottom section 14. The top tab 33 and the bottom tab 34 are positioned such that the apertures 36 align as the top tab 33 aligns with the bottom tab 34 during the transport position thereby allowing the locking mechanism 37 to be inserted therethrough. The locking mechanism 37 prevents excessive movement of the bottom section 14 and top section 21 during the transporting of the tree processing device 10.

A reservoir 38 for lubricating oil for the saws 11, 12 is mounted to one side 39 of the bottom section 14 such that said reservoir 38 does not interfere with the saw as the saw enters the housing 13. Placing the reservoir 38 on the bottom section 14 also prevents the reservoir 14 from interfering with the apparatus as it moves from a transport position to a processing position.

In operation, an operator uses an eye 41 on the top section to selectively move the top section 21 from the transport position to the processing position. To prepare for processing, the operator removes the locking mechanism 37 from the tabs 33, 34 and thereafter uses eye 41 and the tree engaging boom from the trailer 10 to pivot the top section 21 from the transport position adjacent the bottom section 14 to the processing position atop the bottom section 14. Once in the processing position, the flanges 26 of the bottom section 14 align with the recesses 28 of the top section 21 thereby aligning the top section 21 and bottom section 14 as well as preventing them from horizontal movement. Thereafter, the operator uses the lock 29 to secure the top section 21 to the bottom section 14 by placing the handle portion 31 in connection with the receiving portion 32 as conventionally known. Thus, the lock 29 prevents the user from inadvertently moving the housing from the processing position to the transport position.

There has been disclosed heretofore the preferred embodiments of the present invention contemplated. However, it will be obvious to those skilled in the art that there may be modifications to the present invention without departing from this present invention in its broader scope.

What is claimed is:

1. A flip top housing for covering saws used with tree processing devices, comprising:
    (a) a bottom section, said bottom section having an opening on a saw-receiving side such that the saw may enter said housing;
    (b) a plurality of hinges having one side of each said hinges attached to said bottom section; and
    (c) a top section having a cooperative opening on a saw-receiving side such that the saw may enter said housing, said top section pivotally attached to the opposite side of said hinges for selective movement between a processing position atop said bottom section, and a transport position adjacent said bottom section.

2. A flip top housing for covering a saw used with tree processing devices as defined in claim 1, further comprising a lock having a gripping portion fixedly attached to said top section and a receiving portion fixedly attached to said bottom section such that said gripping portion interlocks with said receiving portion during the processing position thereby providing secured engagement of said top section and said bottom section.

3. A flip top housing as defined in claim 1, wherein said bottom section comprises a plurality of flanges integrally connected to and vertically extending above the lip of said bottom section.

4. A flip top housing as defined in claim 3, wherein said top section having recesses along the lip of said top section for receiving said tabs such that said flanges interlock with said recesses during the processing position, thereby stabilizing said top section and said bottom section.

5. A flip top housing as defined in claim 1, further comprising a pair of tabs each having an aperture for receiving a locking mechanism, said tabs defined as a top tab extending substantially perpendicularly of said top section of said housing and a bottom tab extending substantially perpendicularly from said bottom section of said housing.

6. A flip top housing as defined in claim 5, wherein said top tab and said bottom tab are positioned such that said apertures align as said top tab aligns with said bottom tab during the transport position to receive a locking mechanism therethrough.

7. A flip top housing as defined in claim 1, further comprising a reservoir for lubricating oil for the saw blade, said reservoir fixedly attached to one side of said bottom section.

8. A flip top housing for covering chain saw blades used with tree processing devices, comprising:
    (a) a bottom section, said bottom section having an opening on a saw-receiving side such that the saw may enter said housing;
    (b) a plurality of hinges having one side thereof attached to said bottom section;
    (c) a top section having an opening on a saw-receiving side such that the saw may enter said housing, said top section pivotally attached to the opposite sides of said plurality of hinges for selective movement between a processing position atop said bottom section, for shielding the saw blade from the surrounding environment, and a transport position adjacent said bottom section, for allowing said housing to avoid low clearances during the transporting of a tree processing device; and
    (d) a lock providing secured engagement of said top section and said bottom section.

9. A flip top housing as defined in claim 8, wherein said bottom section includes a plurality of flanges integrally connected to and vertically extending above the lip of said bottom section and, wherein said top section defines a plurality of recesses for receiving said flanges such that said flanges interlock with said recesses in the processing position thereby stabilizing said top section and said bottom section.

10. A flip top housing for covering a saw used with tree processing devices, comprising:
  (a) a bottom section, said bottom section having an opening on a saw-receiving side such that a saw may enter said housing;
  (b) a plurality of hinges having one side of each said hinge attached to said bottom section;
  (c) a top section having an opening on a saw-receiving side such that a saw blade may enter said housing, said top section pivotally attached to the opposite sides of said plurality of hinges for selective movement between a processing position atop said bottom section, for shielding the saw blade from the surrounding environment, and a transport position adjacent said bottom section, for allowing said housing to avoid low clearances during the transporting of a tree processing device; and
  (d) a pair of tabs each having an aperture for receiving a locking mechanism, said tabs defined as a top tab extending substantially perpendicularly of said upper portion of said housing and a bottom tab extending substantially perpendicularly from said lower portion of said housing said tabs positioned for cooperative alignment in said transport position.

11. A flip top housing defined in claim 10, wherein said top tab and said bottom tab are positioned such that said apertures align as said top tab aligns with said bottom tab when said upper portion of said housing is in the transport position thereby allowing a locking mechanism to be inserted therethrough.

12. A flip top housing for covering a saw used with tree processing devices, comprising:
  (a) a bottom section, said bottom section having an opening on a chain saw-receiving side such that a saw blade may enter said housing;
  (b) a plurality of hinges having one side of each said hinge attached to said bottom section; and
  (c) a top section having an opening on a saw-receiving side such that a saw blade may enter said housing, said top section pivotally attached to the opposite sides of said plurality of hinges for selective movement between a processing position atop said bottom section, for shielding the saw blade from the surrounding environment, and a transport position adjacent said bottom section, for allowing said housing to evade low clearances during the transporting of a tree processing device; and
  (d) a reservoir for lubricating oil for the saw blade, said reservoir mounted to one side of said bottom section such that said reservoir does not interfere with the saw as the saw enters said housing.

* * * * *